Jan. 20, 1959 H. P. PHILLIPS ET AL 2,869,200
QUICKLY RELEASABLE BUCKLE DEVICE
Filed June 25, 1956 2 Sheets-Sheet 1
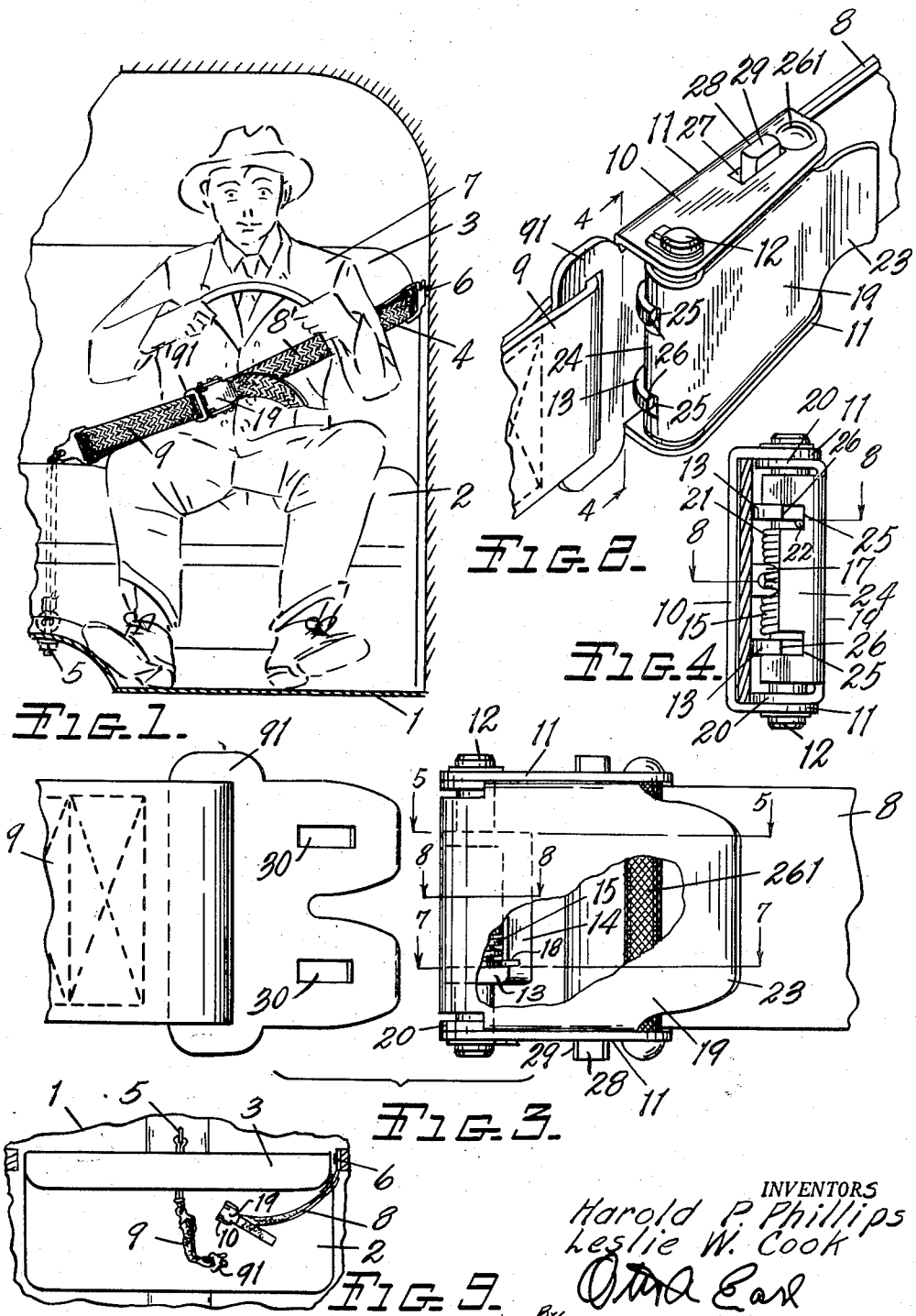
INVENTORS
Harold P. Phillips
Leslie W. Cook
By Otto Earl
Attorney.

Jan. 20, 1959 H. P. PHILLIPS ET AL 2,869,200
QUICKLY RELEASABLE BUCKLE DEVICE
Filed June 25, 1956 2 Sheets-Sheet 2
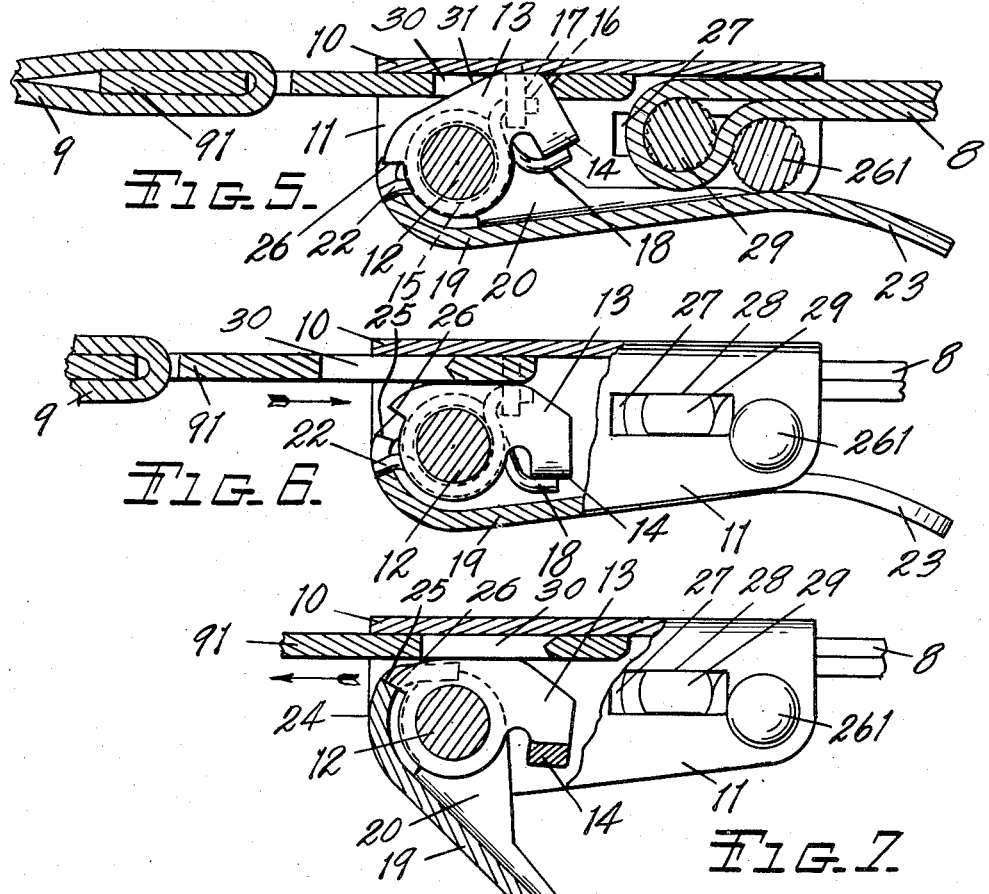
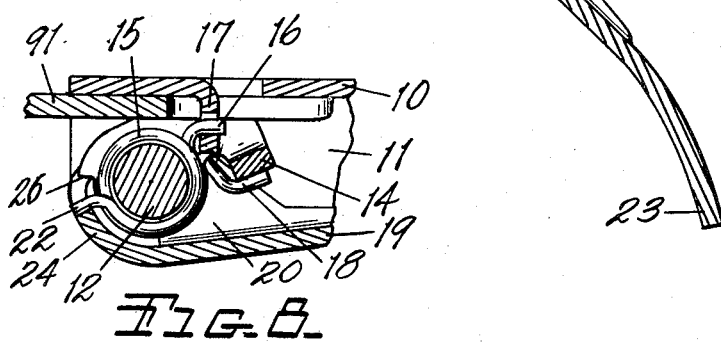
INVENTORS.
Harold P. Phillips
Leslie W. Cook
By
Attorney.

United States Patent Office 2,869,200
Patented Jan. 20, 1959

2,869,200

QUICKLY RELEASABLE BUCKLE DEVICE

Harold P. Phillips and Leslie W. Cook, Hastings, Mich., assignors to Hastings Manufacturing Company, Hastings, Mich.

Application June 25, 1956, Serial No. 593,496

6 Claims. (Cl. 24—78)

This invention relates to a quickly releasable buckle device which is well adapted for use in safety belts for airplanes, motor vehicles and the like.

The main objects of the invention are:

First, to provide a quickly releasable buckle device which may be quickly engaged and quickly released and at the same time is not likely to be accidently released.

Second, to provide a quickly releasable buckle device having means for adjustably connecting it to a strap or belt section and one which is effective in securing to a belt or strap formed of relatively slippery plastic material without puncturing or breaking the fibers thereof and at the same time may be quickly adjusted to the particular user.

Third, to provide a quickly releasable buckle device which is relatively compact and at the same time the parts are strong and capable of sustaining heavy loads.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in front elevation of a quickly releasable buckle embodying our invention as adapted to a safety belt, it being shown in relation to a user and parts of a motor vehicle.

Fig. 2 is an enlarged fragmentary front perspective view.

Fig. 3 is a fragmentary plan view with the coupling member in detached relation to the buckle member.

Fig. 4 is an enlarged sectional view on a line corresponding to line 4—4 of Fig. 2.

Fig. 5 is a fragmentary longitudinal sectional view on a line corresponding to line 5—5 of Fig. 3 with the coupling member in engagement with the buckle member.

Fig. 6 is a fragmentary view partially in longitudinal section with the coupling member partially inserted in the buckle member, the inserting movement being indicated by the arrow.

Fig. 7 is a fragmentary view corresponding to that of Fig. 5 with the release lever in release position.

Fig. 8 is an enlarged fragmentary view on a line corresponding to line 8—8 in Figs. 3 and 4 showing further structural details.

Fig. 9 is a fragmentary plan view showing an adaptation of our invention to a motor vehicle seat.

In the accompanying drawing 1 represents the body of an automobile or the like, 2 a seat thereof and 3 the back of the seat, the safety belt is shown at 4. The inner end of the safety belt is anchored at 5 to the floor at the rear of the seat. The outer end of the safety belt is secured at 6 to an upright portion of the vehicle body. Thus arranged the inner end of the belt is adjacent the leg of the user and its outer end is elevated so that the belt extends diagonally across the body of the user indicated at 7. This general arrangement is that of the Phillips application, Serial No. 505,294, filed May 2, 1955.

The straps or sections of the belt are designated by the numerals 8 and 9.

In the embodiment of our invention illustrated the body of the buckle member comprises a base plate 10 provided with forwardly projecting flanges 11 on its longitudinal edges. The upper edge of these flanges are desirably inclined rearwardly. The pivot 12 is mounted upon and extends between the flanges being positioned closely adjacent their front ends. This pivot is spaced from the base plate for purposes which will be apparent as the description proceeds.

A catch comprising a pair of coupling member engaging jaws 13 is swingably or pivotally mounted on the pivot 12, the jaws being connected by a cross piece 14 disposed at the rear of the pivot. A coil spring 15 is disposed on the pivot between the pivot engaging portions of the catch, the end 16 of the spring being engaged with the lug 17 which is struck out from the base of the body member as is clearly shown in Fig. 8. The outer end of the spring 18 is engaged with the cross piece 14 of the catch member. This spring acts to bias the catch member so that the jaws thereof are normally in thrust engagement with the base plate. The actuating or catch release lever 19 has rearwardly projecting pivot ears 20, these ears are disposed at the outer side of the catch.

A second coil spring 21 is arranged on the pivot with one end engaged with the lug 17 and the other end 22 engaged with the lever, see Fig. 8, to bias the lever to catch releasing position.

The lever is of such width that a substantial portion thereof lies between the flanges of the body member when it is in retracted position and constitutes a cover for the parts disposed between the flanges. However, it is desirably provided with a finger piece 23 which projects beyond the flanges of the body member for convenient grasping.

The lever has an inturned flange 24 at its forward end desirably curved so that it does not present any angles with which the hands of a user might contact. The inwardly projecting flange portion of the lever is provided with tappet portions 25 which coact with the tappet portions 26 of the catch to disengage the catch with an outward swinging movement of the lever. These coengaging portions of the catch and lever are substantially spaced when the lever is in retracted position so that the lever may be swung with substantial distance or degree without disengaging the catch. This minimizes accidental releasing of the safety belt.

To adapt the device for use by persons of different size the belt or strap section 8 is adjustably connected to the body member. This connection consists of the knurled cylindrical cross piece 261 extending between the flanges of the body member and desirably positioned close to the rear ends thereof. The flanges have longitudinal slots 27 therein in which the flattened ends 28 of the knurled cylindrical pin 29 so that the pin is slidably supported relative to the cross piece 261. The strap 8 is looped around the pin 29 so that pull on the strap clamps the same between the cross piece 261 and the pin 29. While this permits easy and rapid adjustment of the strap 8 it is effectively connected to the buckle body member in its adjusted position and any load tends to clutch the strap more firmly.

The strap or belt section 9 is provided with a plate like coupling member 91 which is provided with a pair of laterally spaced jaw receiving keeper openings 30. This coupling member is designed to be inserted in the forward end of the body member while in supported relation to the base plate thereof to thrustingly engage the edges 31 of the catch and lift it against the tension of its biasing spring until the catch jaws snap into the keeper openings thereof. The jaws automatically snap into the keeper openings 30 when the coupling member reaches locking position, as is shown in Fig. 5. To release the coupling member the lever is swung outwardly to bring the catch engaging member thereof into engagement with the catch and the movement continued until the coupling is released.

We have illustrated and described our invention in a very highly practical embodiment thereof. We have not attempted to illustrate or describe other embodiments or adaptations as it is believed this disclosure will enable those skilled in the art to embody or adapt our invention as may be desired.

Having thus described our invention, what we claim as new and desire to secure by Letters Patent is:

1. A quickly releasable buckle device comprising a base plate provided with outwardly projecting flanges on its longitudinal edges, a pivot mounted in a fixed position on and extending between the flanges adjacent their front ends in spaced relation to the base plate, said base plate having an outwardly projecting lug at the rear of said pivot, laterally spaced catch jaws pivotally mounted on said pivot and connected by a cross piece disposed at the rear of the pivot, a coil spring arranged on said pivot with one end engaged with said lug and the other with said jaw cross piece and acting to bias the jaws rearwardly into supported engagement with the base plate, a jaw release lever provided with ears pivotally engaged with said pivot, a second coil spring arranged on said pivot with one end engaged with said lug on said base plate and the other with said lever and acting to bias it to retracted position, said lever having a rearwardly turned flange at its pivoted end, said jaws and flange having coacting tappet portions which are engaged to release the jaws when the lever is actuated but which are substantially spaced when the lever is in fully retracted position, said lever being of such width that the major portion thereof lies between the base plate flanges when the lever is in retracted position, the lever being provided with a finger piece projecting beyond the rear ends of the flanges, and a coacting coupling member of flat section provided with openings positioned to be automatically engaged by said catch jaws when the coupling member is thrust against the jaws while in supported relation to said base plate, said coupling member being slotted to receive said lug on said base plate.

2. A quickly releasable buckle device comprising a base plate provided with outwardly projecting flanges on its longitudinal edges, a pivot mounted in a fixed position on and extending between the flanges adjacent their front ends in spaced relation to the base plate said base plate having an outwardly projecting lug at the rear of said pivot, laterally spaced catch jaws pivotally mounted on said pivot and connected by cross piece disposed at the rear of the pivot, a coil spring arranged on said pivot with one end engaged with said lug and the other with said jaw cross piece and acting to bias the jaws rearwardly into supported engagement with the base plate, a jaw release lever provided with ears pivotally engaged with said pivot, a second coil spring arranged on said pivot with one end engaged with said lug on said base plate and the other with said lever and acting to bias it to retracted position, said jaws and flange having coacting tappet portions which are engaged to release the jaws when the lever is actuated but which are substantially spaced when the lever is in fully retracted position, and a coacting coupling member of flat section provided with openings positioned to be automatically engaged by said catch jaws when the coupling member is thrust against the jaws while in supported relation to said base plate, said coupling member being slotted to receive said lug on said base plate.

3. A quickly releasable buckle device comprising a base plate provided with outwardly projecting flanges on its longitudinal edges, a pivot mounted in a fixed position on and extending between the flanges adjacent their front ends in spaced relation to the base plate, a catch comprising laterally spaced catch jaws pivotally mounted on said pivot, a coil spring arranged on said pivot with one end engaged with said catch and the other with said base plate to bias the jaws rearwardly into supported engagement with the base plate, a jaw release lever pivotally mounted on said pivot, a second coil spring arranged on said pivot with one end engaged with said base plate and the other with said lever and acting to bias it to retracted position, said lever having a rearwardly turned flange at its pivoted end, said jaws and flange having coacting tappet portions which are engaged to release the jaws when the lever is actuated but which are substantially spaced when the lever is in fully retracted position, and a coacting coupling member of flat section provided with openings positioned to receive said catch jaws and engageable therewith by thrusting the coupling member against the jaws.

4. A quickly releasable buckle device comprising a body member provided with laterally spaced outwardly projecting flanges, a pivot disposed in a fixed position between the flanges in spaced relation to the body member, a catch jaw pivotally mounted on said pivot, a coil spring arranged on said pivot and acting to bias said catch jaw rearwardly into supported engagement with the body member, a catch jaw release lever pivotally mounted on said pivot, a second coil spring arranged on said pivot and acting to bias said lever to retracted position, said lever having an inwardly projecting catch engaging portion substantially spaced from the catch when the lever is in fully retracted position, and a coacting strap coupling member provided with an opening positioned to be automatically engaged by said catch when the coupling member is thrust against it in slidably supported relation to said body member.

5. A quickly releasable buckle device comprising a body member provided with laterally spaced outwardly projecting flanges, a pivot disposed in a fixed position between the flanges in spaced relation to the body member, a catch jaw pivotally mounted on said pivot, a coil spring arranged on said pivot and acting to bias said catch jaw rearwardly into supported engagement with the body member, a catch jaw release lever pivotally mounted on said pivot, a second coil spring arranged on said pivot and acting to bias said lever to retracted position, said lever having an inwardly projecting catch engaging portion substantially spaced from the catch when the lever is in fully retracted position, and a coacting strap coupling member manually engageable with said catch with the actuating lever in its fully retracted position.

6. A quickly releasable buckle device comprising a body member provided with laterally spaced outwardly projecting flanges, a pivot disposed in a fixed position between the flanges in spaced relation to the body member, a catch jaw pivotally mounted on said pivot, a coil spring arranged on said pivot and acting to bias said catch jaw rearwardly into supporting engagement with the body member, a catch jaw release lever pivotally mounted on said pivot, a second coil spring arranged on said pivot and acting to bias said lever to retracted position, said lever having an inwardly projecting catch engaging portion substantially spaced from the catch when the lever is in fully retracted position, said lever being of such width that the major portion thereof lies between the body member flanges when the lever is in further retracted position, the lever being provided with a finger piece projecting beyond the rear ends of the flanges, and a coacting strap coupling member manually engageable wtih said catch with the actuating lever in its fully retracted position.

References Cited in the file of this patent

UNITED STATES PATENTS

| | | |
|---|---|---|
| 1,712,096 | Sherman | May 7, 1929 |
| 2,458,810 | Varney | Jan. 11, 1949 |
| 2,751,656 | Noe | June 26, 1956 |

FOREIGN PATENTS

| | | |
|---|---|---|
| 295,898 | Italy | May 3, 1932 |
| 566,014 | France | Feb. 8, 1924 |
| 738,989 | Great Britain | Oct. 26, 1955 |
| 781,228 | France | May 11, 1935 |